(12) United States Patent
Duarte Pereira et al.

(10) Patent No.: US 11,867,154 B2
(45) Date of Patent: Jan. 9, 2024

(54) OPERATING A WIND TURBINE WITH SENSORS IMPLEMENTED BY A TRAINED MACHINE LEARNING MODEL

(71) Applicant: VESTAS WIND SYSTEMS A/S, Aarhus N (DK)

(72) Inventors: Goncalo Artur Duarte Pereira, Leça Do Balio (PT); Ines Pinto Frutuoso, Viana Do Castelo (PT); Johnny Nielsen, Svenstrup J (DK); Jens Van Schelve, Oporto (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 360 days.

(21) Appl. No.: 17/132,942

(22) Filed: Dec. 23, 2020

(65) Prior Publication Data

US 2021/0190041 A1 Jun. 24, 2021

(30) Foreign Application Priority Data

Dec. 23, 2019 (DK) .......................... PA 2019 01549

(51) Int. Cl.
*F03D 7/04* (2006.01)
*F03D 17/00* (2016.01)

(52) U.S. Cl.
CPC ............. *F03D 7/046* (2013.01); *F03D 7/045* (2013.01); *F03D 17/00* (2016.05);
(Continued)

(58) Field of Classification Search
CPC .......... F03D 7/045; F03D 7/046; F03D 17/00; F05B 2260/84; F05B 2270/404; F05B 2270/709; F05B 2270/80
See application file for complete search history.

(56) References Cited

U.S. PATENT DOCUMENTS 8,249,852 B2 * 8/2012 Thulke ............... G05B 23/0254
290/44
9,606,518 B2 * 3/2017 Evans ..................... F03D 7/048
(Continued)

FOREIGN PATENT DOCUMENTS

DE 102010054631 A1 6/2012
EP 1873396 A2 1/2008
(Continued)

OTHER PUBLICATIONS

European Patent Office European Search Report for Application No. 20216937.1-1007 dated May 19, 2021.
(Continued)

*Primary Examiner* — Juan G Flores
*Assistant Examiner* — Jason G Davis
(74) *Attorney, Agent, or Firm* — Patterson + Sheridan, LLP

(57) ABSTRACT

The present invention relates to a method of operating a wind turbine with an operational parameter where values of the operational parameter are obtained by different sensors and compared to determine the validity of the value. A first value and a second value of the operational parameter are obtained different sensors and validated by comparing the two values. The wind turbine being operated using a validated value as the operational parameter. The two sensors are selected among a trained machine learning model, a reference sensor and a computerized physical model.

19 Claims, 6 Drawing Sheets

(52) U.S. Cl.
CPC ..... *F05B 2260/84* (2013.01); *F05B 2270/404* (2013.01); *F05B 2270/709* (2013.01); *F05B 2270/80* (2013.01)

(56) References Cited

U.S. PATENT DOCUMENTS

| | | | |
|---|---|---|---|
| 9,644,612 B2 * | 5/2017 | Evans | .................. H02J 3/381 |
| 10,605,228 B2 * | 3/2020 | Evans | .................. F03D 7/048 |
| 10,954,919 B1 * | 3/2021 | Evans | .................. G06Q 50/06 |
| 2016/0084233 A1 | 3/2016 | Evans et al. | |

FOREIGN PATENT DOCUMENTS

| | | | | |
|---|---|---|---|---|
| EP | 2213873 A1 * | 8/2010 | ........... | F03D 7/0204 |
| EP | 2589943 A1 | 5/2013 | | |
| EP | 3260700 A1 | 12/2017 | | |
| EP | 3613982 A1 | 2/2020 | | |
| WO | 2018228648 A1 | 12/2018 | | |

OTHER PUBLICATIONS

Feng Xiaoran et al., "A Model-Based predictive Control for FTC for wind turbine wind speed sensor fault," 2013 Conference on Control and Fault-Tolerant Systems (Systol), IEEE, Oct. 9, 2013, pp. 504-509.

Stetco Adrain et al., "Machine Learning Methods for Wind Turbine Condition Monitoring: A Review", Renewable Energy, Pergamon Press, Oxford, GB, vol. 133, Oct. 9, 2018, pp. 620-635.

Danish Patent and Trademark Office, 1st Technical Examination of Patent Application: PA 2019 01549, 2019P00165DK RJ, dated Jun. 22, 2020.

Danish Patent and Trademark Office, Search Report for Patent Application: PA 2019 01549, dated Jun. 17, 2020.

Danish Patent and Trademark Office, Search Opinion for Application: PA 2019 01549, dated Jun. 22, 2020.

European Patent Office, Communication pursuant to Article 94(3) EPC for Application 20 216 937.1-1002 dated Oct. 2, 2023.

* cited by examiner

OPERATING A WIND TURBINE WITH SENSORS IMPLEMENTED BY A TRAINED MACHINE LEARNING MODEL

FIELD OF THE INVENTION

The present invention relates to a method of operating a wind turbine with an operational parameter where values of the operational parameter are obtained by different sensors and compared to determine the validity of the value. A sensor for determining a value may be implemented by a trained machine learning model.

BACKGROUND OF THE INVENTION

There are many sensors in a turbine that are required for the turbine to operate in a proper manner. If certain sensors fail, the turbine will stop production and not start up again before the sensor has been fixed or replaced. This means that the turbine will lose production until a service team can come to the turbine.

One way to reduce the downtime is to add a redundant sensor that can be used if the main sensor fails. However, such a redundant sensor may be expensive and require space that is not available. Also, adding new sensors requires new input/output's (I/O's) which may require an upgrade of the control system.

Another way to deal with the problem of a failing sensor is to provide a computerized model of the physical system and use other sensors, together with the model, to estimate or predict the parameter that the main sensor is measuring. This method is normally fine for simple systems where an accurate model can be made. One of the drawbacks is that it normally requires turbine type-specific parameters that need to be updated each time a new turbine type is made. Another drawback is that sometimes the model is so complex that it is very difficult to make it fit all conditions without being inaccurate.

SUMMARY OF THE INVENTION

A first aspect of the invention provides a method of operating a wind turbine in accordance with an operational parameter, the method comprising:
 obtaining a first value of the operational parameter by a first sensor;
 obtaining a second value of the operational parameter by a second sensor different to the first sensor;
 comparing the first value with the second value in accordance with a comparison criterion, if the comparing fulfils the comparison criterion, the first value is determined to be valid;
 if the first value of the operational parameter is a valid first value, operate the wind turbine using the first value as the operational parameter;
 wherein the first sensor and the second sensor are selected from the group of: a trained machine learning model, taking a set of operating parameters as input and outputting the first value or the second value; a reference sensor arranged for measuring the first value or the second value; and a computerized physical model taking a set of operating parameters as input and outputting the first value or the second value.

The present invention provides a method where the operational parameter is determined by two different sensors, where one of the sensors may be implemented as a model, e.g. a pre-trained machine learning model. The method takes into account possible inaccuracy or unpredictability in the output of a sensor for certain situations and includes a validation of one sensor value with a second sensor value before relying on the value to operate the wind turbine.

In connection with this invention, the term sensor is used in a broad sense, and includes a computing model implemented on a computing unit, interfaced with one or more inputs and an output, the output being the sensor value. In embodiments of the invention, various sensor values from dedicated sensors may be input into a sensor implementing a model, which based on the inputs, provides an output in the form of a sensor value (or signal). A sensor is in one sense a device which based on a physical principle converts a measured value into a sensor value representing a physical quantity, this may be referred to as a physical sensor. A sensor is in another sense implemented on a computing entity which based on calculation provides the sensor value.

In one important embodiment, at least one of the sensors are implemented as a trained machine learning model, taking a set of operating parameters as input and outputting the first value or the second value as the sensor value. For example, an output of the machine learning model may be used as a sensor value such as a yaw direction, a power setting or a blade pitch angle.

In embodiments, reference sensors and/or sensors implementing computerized physical models may be used. The reference sensor may be a sensor of the wind turbine, a sensor of another wind turbine, or a sensor not associated with a particular wind turbine. Likewise, the computerized model may, as an alternative to a machine learning model, be a physical model: including a physical model of the wind turbine, a physical model of another wind turbine, or a physical model not associated with a particular wind turbine.

The operational parameter may be a value, which represents a physical quantity, such as wind speed, wind direction, blade pitch angle, blade load, temperature, rotor azimuth angle, rotor speed, tower acceleration, power, nacelle position, light intensity, or time of day.

Comparing the first value with the second value in accordance with the comparison criterion may be based on comparing a statistical value of the first value and a statistical value of the second value which are obtained by statistically analysing a time series of the first and second values. For instance, the statistical value may be an expected value, an average, a standard deviation, a variance, or an output of a cumulative sequential analysis.

Comparing the first value with the second value in accordance with the comparison criterion may be comparing the first value and the second value to generate an indicator (for instance a difference or a ratio); and comparing the indicator with a validation threshold.

The first sensor and/or second sensor may be one or more of: a temperature sensor, a wind speed sensor, a wind direction sensor, a blade load sensor, a blade pitch angle sensor, a rotor azimuth angle sensor, a rotor speed sensor, a tower top acceleration sensor, a power sensor, a nacelle position sensor, a light intensity sensor, and a time of day sensor.

The machine learning model may be pre-trained in a prior step by feeding a training data set into the machine learning model. The training data set may be from one or more of: a temperature sensor, a wind speed sensor, a wind direction sensor, a blade load sensor, a blade pitch angle sensor, a rotor azimuth angle sensor, a rotor speed sensor, a tower top acceleration sensor, a power sensor, a nacelle position sensor, a light intensity sensor, and a time of day sensor. The sensors used to produce the training data set may be sensors of the wind turbine, a sensor of another wind turbine, or a sensor not associated with a particular wind turbine.

In an embodiment, the first sensor is based on a trained machine learning model and the second sensor is a reference sensor. The machine learning model sensor may be validated by comparing the first output with the second output from the reference sensor. In this case the reference sensor may be a wind direction sensor, a wind direction sensor, a blade pitch angle sensor, a blade load sensor, or an ambient temperature sensor for example, The reference sensor may provide one of the sensor inputs that are fed into the machine learning model sensor. In this way, the trained machine learning model sensor may be an enhanced version of the reference sensor.

If the first value fails validation then the reference sensor, the computerized model, a further sensor may be used to operate the wind turbine. In an embodiment, in case of a non-validation of the first value, the wind turbine may be shut down, de-rated or a control strategy of the wind turbine may be changed.

In an embodiment, the first sensor is based on a trained machine learning model and the second sensor is based on a computerized model, such as a physical model of the wind turbine.

In an embodiment, the first sensor is based on a first trained machine learning model, and the second sensor is based on a second trained machine learning model.

The second machine learning model may be different to the first machine learning model. For instance, the second machine learning model may be trained on a different training data set to the first machine learning model and/or trained using a different machine learning method to the first machine learning model.

The method may further comprise training the first machine learning model by feeding a first training data set into the first machine learning model; and training the second machine learning model by feeding a second training data set into the second machine learning model, wherein the second training data set is different to the first training data set.

Alternatively, the first and second machine learning models may be trained on the same training data set but using different machine learning methods. For instance, one may be trained by Linear Regression and the other may be trained by Support Vector Machine Regression.

Optionally the sensor inputs are a first set of sensor inputs from a first set of sensors, and the method comprises feeding a second set of sensor inputs from a second set of sensors into the second model to obtain the second output, wherein the second set of sensors is different to the first set of sensors. The first set of sensors may be a single sensor, or multiple sensors. The second set of sensors may be a single sensor, or multiple sensors.

A further aspect of the invention provides a wind turbine system comprising a wind turbine, and a control system configured to operate the wind turbine by the method of the first aspect of the invention. The control system may be part of an initial configuration of the wind turbine system, or it may be retrofit.

A further aspect of the invention provides a computer program product comprising software code adapted to operate a wind turbine when executed on a data processing system, the computer program product being adapted to perform the method of the first aspect of the invention.

BRIEF DESCRIPTION OF THE DRAWINGS

Embodiments of the invention will now be described with reference to the accompanying drawings, in which.

DESCRIPTION OF EMBODIMENT(S)

Figure 1:
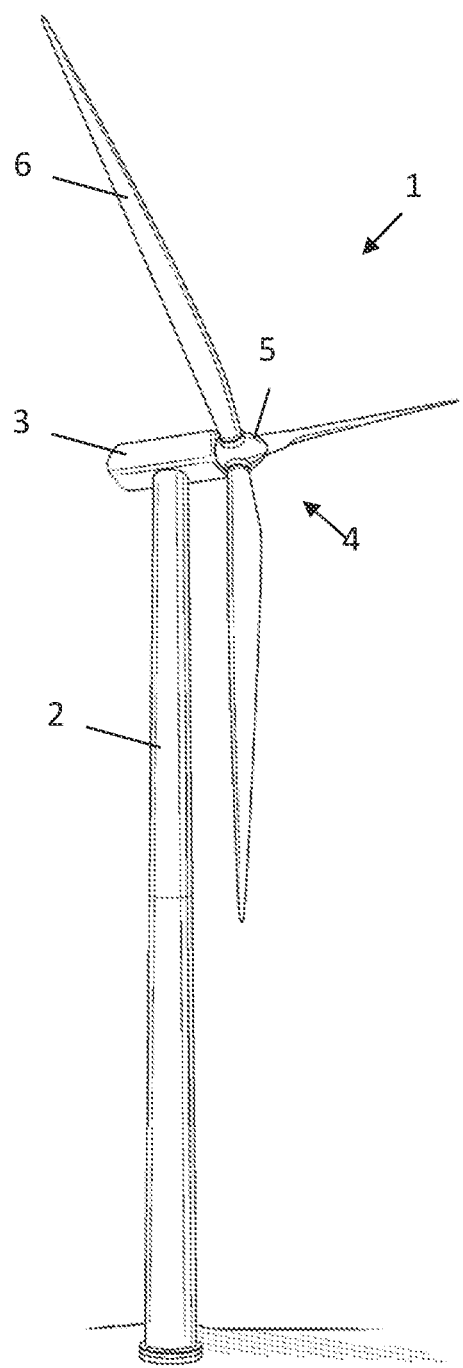
FIG. 1 shows a wind turbine.

FIG. 1 shows a wind turbine 1. The wind turbine 1 has a tower 2 and a nacelle 3 at the top of the tower 2. A wind turbine rotor 4 is connected to the nacelle 3 and arranged to rotate relative to the nacelle 3. The wind turbine rotor 4 comprises a wind turbine hub 5, and multiple wind turbines blades 6 extending from the hub 5. While a wind turbine rotor 4 having three blades 6 is shown, a different number of blades, such as two or four, may be used.

Figure 2:
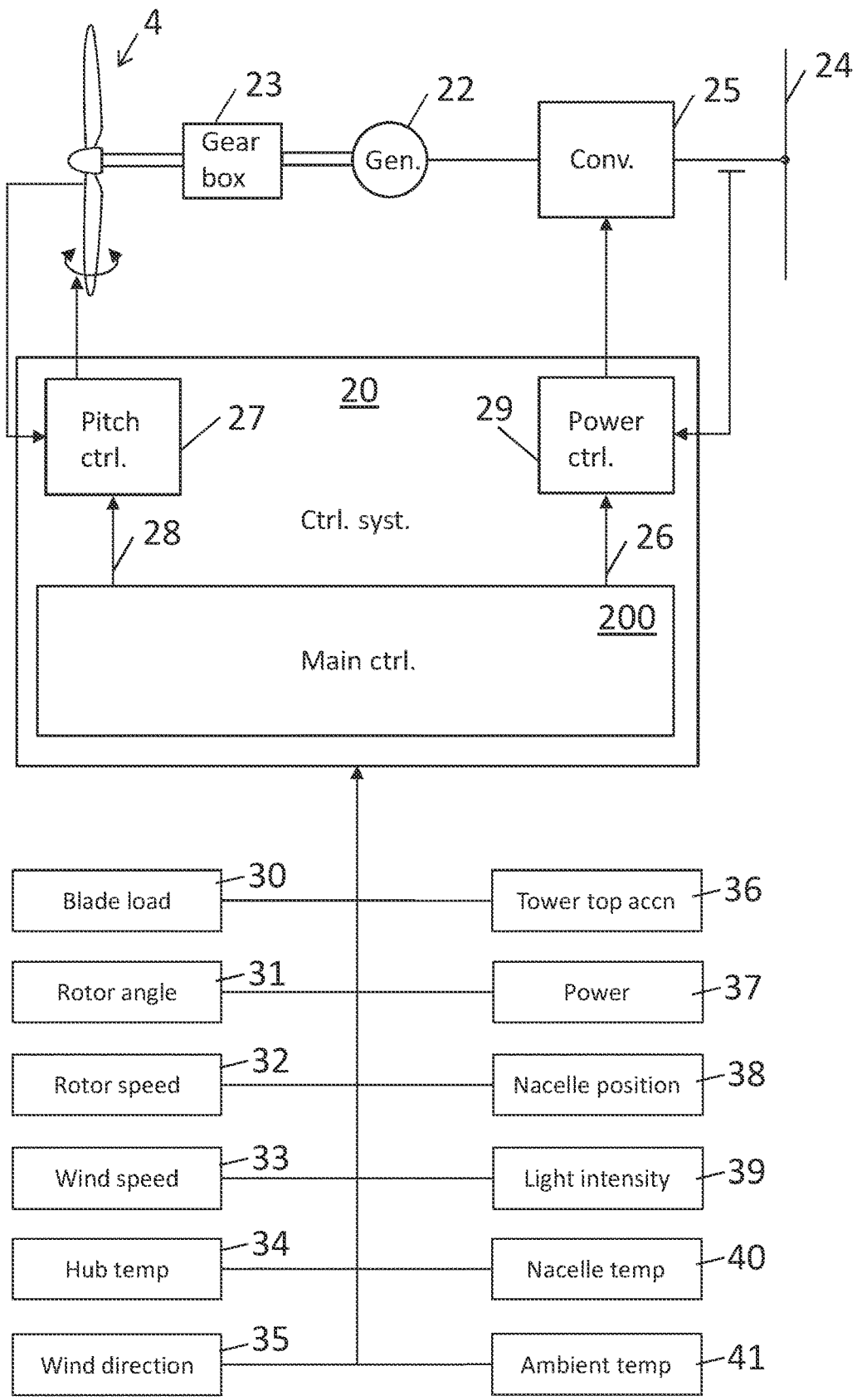
FIG. 2 shows a control system for controlling the wind turbine of FIG. 1.

FIG. 2 schematically illustrates an embodiment of a control system 20 for controlling the wind turbine 1. The rotor 4 is mechanically connected to an electrical generator 22 via a gearbox 23. In direct drive systems, and other systems, the gearbox 23 may not be present. The electrical power generated by the generator 22 is injected into a power grid 24 via an electrical converter 25. The electrical generator 22 and the converter 25 may be based on a full-scale converter (FSC) architecture or a doubly fed induction generator (DFIG) architecture, but other types may be used. The control system 20 comprises a number of elements, including at least one main controller 200 with a processor and a memory, so that the processor is capable of executing computing tasks based on instructions stored in the memory.

In general, the control system 20 ensures that in operation the wind turbine generates a requested power output level. This is obtained by adjusting the pitch angle of the blades 6 and/or the power extraction of the converter 25. To this end, the control system comprises a pitch system including a pitch controller 27 using a pitch reference 28, and a power system including a power controller 29 using a power reference 26. The rotor blades 6 can be pitched by a pitch mechanism. The rotor may comprise a common pitch system which adjusts all pitch angles on all rotor blades at the same time, as well as in addition thereto an individual pitch system which is capable of individual pitching of the rotor blades.

The wind turbine 1 and the control system 20 together constitute a wind turbine system. The control system 20 may be integrated with the wind turbine 1—for instance housed in the nacelle or tower. Alternatively, the control system 20, or elements of the control system 20, may be placed remotely in a power plant controller (not shown) so that the wind turbine 1 may be operated based on externally provided instructions.

The control system 20 may receive sensor signals from various sensors, such as the sensors 30-41 shown in FIG. 2. These sensors comprise a blade load sensor 30, a rotor azimuth angle sensor 31, a rotor speed sensor 32, a wind speed sensor 33, a hub temperature sensor 34, a wind direction sensor 35, a tower top acceleration sensor 36, a power sensor 37, a nacelle position sensor 38, a light intensity sensor 39, a nacelle temperature sensor 40 and an ambient temperature sensor 41. This set of sensors is not exhaustive, and less sensors or further sensors may be used if required.

The control system 20 may be configured to operate the wind turbine by one or more of the various methods described below with reference to FIGS. 3 to 6. More specifically, the control system 20 may store a computer program product comprising software code adapted to operate the wind turbine 1 when executed on a data processing system of the control system 20. The computer program product is adapted to perform one or more of the various methods described below with reference to FIGS. 3 to 6.

Figure 3:
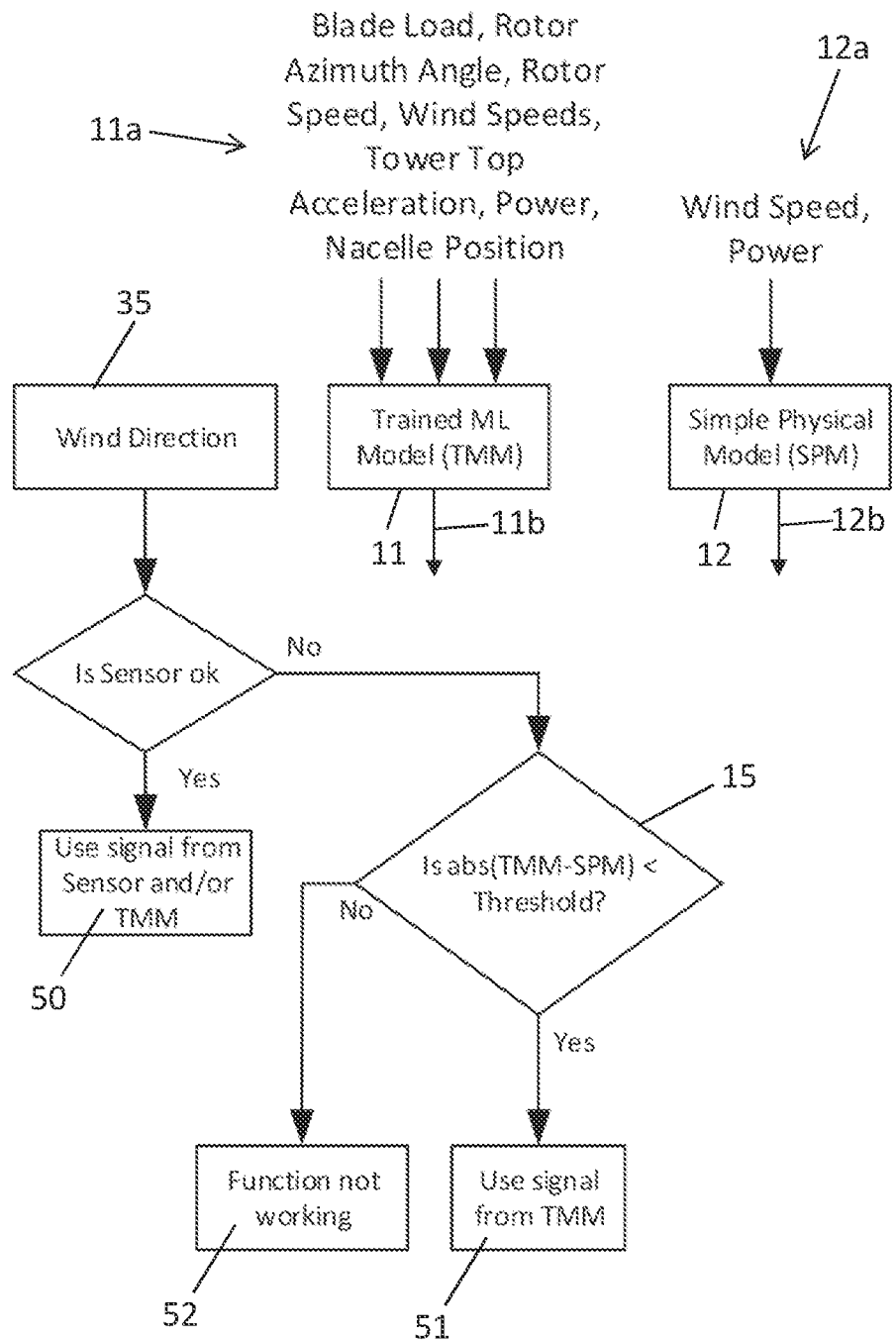
FIG. 3 shows a first method of operating the wind turbine.

A first method shown in FIG. 3 may be used to safeguard the wind turbine against failure or inaccuracy of the wind direction sensor 35, or any other sensor. The wind direction 35 is in this embodiment the first sensor arranged for obtaining a first value of the operational parameter wind direction.

The wind direction sensor 35 outputs a wind direction relative to the heading of the nacelle. For example, the sensor 35 may be a wind vane or ultrasonic wind sensor.

In a prior step, a machine learning model is trained by feeding a training data set into the machine learning model. The trained machine learning model is implemented as the second sensor arranged for obtaining a second value of the operational parameter wind direction. This produces a trained machine learning model sensor (TMM) 11 shown in FIG. 3. The TMM 11 may be stored in the memory of the main controller 200, or in any other suitable location.

Because it is complex to predict the wind direction without a dedicated sensor, the TMM 11 may be trained using a lot of different inputs. The training data set may comprise signals indicating various parameter values such as blade load, rotor azimuth angle, rotor speed, wind speed, tower top acceleration, power and/or nacelle position for example, along with wind direction. The training data set may be from some of the sensors 30-41 of the wind turbine 1, or other sensors (for instance sensors of another wind turbine).

The trained TMM sensor 11 is then able to receive sensor inputs 11a (for instance inputs from some or all sensors 30-41 of the wind turbine 1) during operation of the wind turbine, and produce an output predicting the wind direction based on these sensor inputs 11a.

The TMM sensor 11 may be implemented using a neural network or a support vector machine regression model, for example. The TMM sensor 11 may have been trained by supervised learning (developing a predictive model based on both input and output data) or unsupervised learning (grouping and interpreting data based only on input data).

As a further sensor, a computerized model in the form of a simple physical model (SPM) sensor 12 is also provided. The SPM sensor 12 may be stored in the same memory as the TMM sensor 11, or in any other suitable place. Unlike the TMM 11, the SPM 12 is not trained by machine learning but rather generated in some other way. The SPM 12 in this example can produce an output predictive of the wind direction based on input signals 12a from a wind speed sensor and a power sensor.

The SPM 12 may be stored in the memory of the main controller 200 and receive input signals from the wind speed sensor 33 and the power sensor 37 of the wind turbine 1. Alternatively, the SPM 12 may be stored on another wind turbine and/or receive equivalent sensor signals from sensors of another wind turbine.

If the wind direction sensor 35 is OK, then the wind direction signal from the sensor 35 and/or the wind direction estimate from the TMM 11 is used by the control system 20 to operate the wind turbine at step 50. Thus, for example if the wind direction changes, then the yaw direction of the nacelle and/or other operating parameters of the wind turbine may be changed at step 50 in response to the change of wind direction.

If the wind direction sensor 35 is not OK (for instance if it has failed or is producing inaccurate data) then the TMM sensor 11 is validated at step 15 and only used by the control system 10 as a substitute for the sensor 35 at step 51 if it passes the validation process.

More specifically, the control system 20 may feed sensor inputs 11a into the TMM sensor 11 to obtain a first value 11b. By way of example, these sensor inputs 11a may be received from the blade load sensor 30, rotor azimuth angle sensor 31, rotor speed sensor 32, wind speed sensor 33, tower top acceleration sensor 36, power sensor 37, and nacelle position sensor 38. The TMM 11 is then validated at step 15 by comparing the first value 11b with a second value 12b from the SPM sensor 12.

In response to obtaining valid value of the TMM sensor 11 (that is, if the TMM 11 is validated at step 15) then the TMM sensor value 11 may be used to operate the wind turbine at step 51. Thus for example if the wind direction predicted by the TMM sensor 11 changes, then the yaw direction of the nacelle and/or other operating parameters of the wind turbine may be changed at step 51 in response to the change.

The TMM sensor value 11 may be validated by determining a difference or ratio between the first value 11b and the second value 12b; and comparing the difference or ratio with a threshold. For example, the TMM sensor value 11 may be validated if abs (TMM-SPM) is less than a threshold, where (TMM-SPM) is a difference between the first and second values 11b and 12b of the sensors.

In this case, the TMM 11 is validated at step 15 by directly comparing single instantaneous parameter values (i.e. wind direction values) output by the TMM 11 and the SPM 12. In other examples, statistical values (i.e. values obtained by statistically analysing a time series of parameter values) may be compared instead of (or in addition to) the parameter values, to validate the TMM 11.

For example, the control system 20 may calculate a difference between WD1(Average) and WD2(Average), where WD1(Average) is a mean average of a time series of wind directions generated by the TMM 11, and WD2(Average) is an average of a time series of wind directions generated by the SPM 12.

In another example, the control system 20 may calculate a ratio between SD1 and SD2, where SD1 is a standard deviation of a time series of wind directions generated by the TMM 11, and SD2 is a standard deviation of a time series of wind directions generated by the SPM 12. If the ratio SD1/SD2 is outside a range (for instance 0.8 to 1.2), then the TMM 11 is not validated and not used to operate the wind turbine at step 51. If the ratio SD1/SD2 is within the range, the TMM 11 may be validated and used to operate the wind turbine at step 51.

In other examples, the control system 20 may perform the validation by comparing other statistical measures, for instance a max value, median value, min value, variance or an output of a cumulative sequential analysis such as CUSUM.

If the TMM 11 is not validated, then the process may reach a "function not working" state 52. When this "function not working" state 52 is reached in response to a non-validation of the TMM 11, then a number of actions may be taken. For example, the control system 20 may use another substitute system to operate the wind turbine. The substitute system may be a redundant reference sensor, the SPM sensor 12, a further sensor, or a further model (not shown) for example. Alternatively, the control system 20 may shut down, uprate or de-rate the wind turbine when it reaches state 52.

In summary, upon failure of the wind direction sensor 35, the process of FIG. 3 operates as follows. Sensor inputs 11a are fed into the TMM sensor 11 to obtain a first value 11b. The TMM sensor 11 is validated by comparing the first value 11b with a second value 12b from the SPM sensor 12. In response to a validation of the TMM sensor value 11b, the TMM 11 sensor is used to operate the wind turbine. The TMM sensor 11 continues to be used, and is continuously validated by feeding further sensor inputs into the TMM sensor 11 to obtain subsequent first values, and validating the TMM sensor 11 by comparing the subsequent first values with subsequent second values from the SPM sensor 12. This continues until the TMM 11 fails the validation process. In response to a non-validation of the TMM 11, the process reaches the "function not working" state 52.

The method of FIG. 3 uses the TMM sensor 11 as a backup solution if the sensor 35 is failing. However, a problem with some trained machine learning models is that they are not always as good if they encounter situations different from the situations they have been trained on. This means that sometimes the TMM 11 may give outputs that are wrong. The SPM sensor 12 may not be very accurate, but it will follow some simple physical rules that will prevent it from being totally wrong. By comparing the signals from SPM sensor 12 and TMM sensor 11 it is possible to check if the TMM 11 is suddenly wrong and thereby inform the control system 20 that the output from the TMM 11 is no longer valid.

The method of FIG. 3 safeguards the wind turbine against failure or inaccuracy of the wind direction sensor 35, but an equivalent method may be used to safeguard the wind turbine against failure or inaccuracy of any of its other sensors 30-41.

An example of an equivalent method is one which safeguards the wind turbine against failure or inaccuracy of a gearbox oil temperature sensor—i.e. a sensor which measures the temperature of the oil in the gearbox 23. A bearing sensor measure the temperature of the bearing. The oil is heating up because the bearing gets hot and the oil is cooling the bearing down. So it is known that in almost all cases the bearing temperature will be higher than the oil temperature, for instance 1° C. higher, 10-12° C. higher and in some cases up to 20° C. higher. So, a simple physical model in this instance could simply be that the oil temperature is assumed to be 10° lower than the bearing temperature.

This output of the simple physical model may be compared with the output of a machine learning model which takes as its inputs the inlet water flow, water cooling temperature, power and ambient temperature, for example. This enables the machine learning model to be validated if its output is close to the output of the simple physical model (for instance within 5° C.). The output of the validated machine learning model may then be used to operate the wind turbine: for instance, if the gear oil temperature exceeds 80° C., then the turbine may be stopped.

Figure 4:
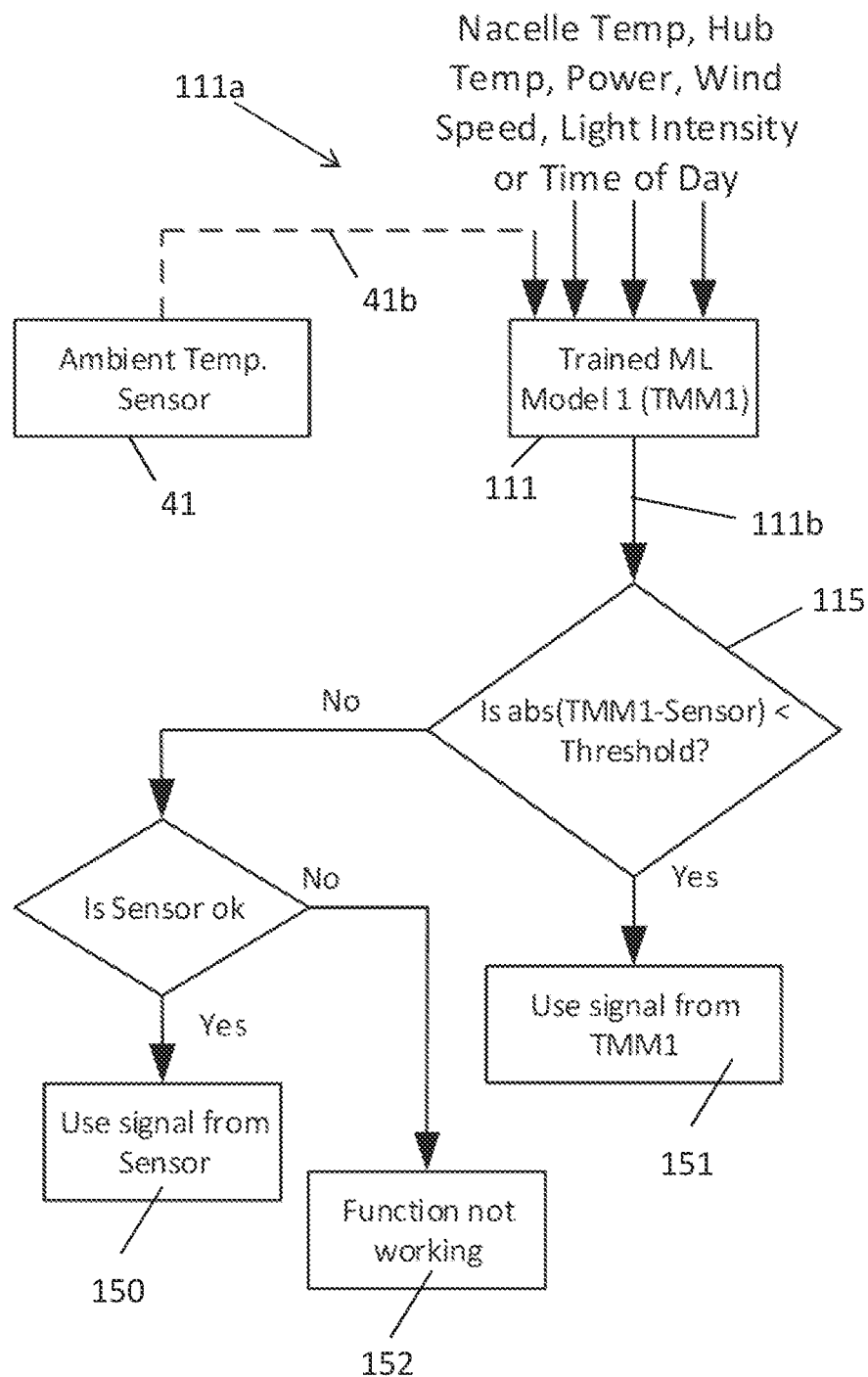
FIG. 4 shows a second method of operating the wind turbine.

A second method shown in FIG. 4 uses an ambient temperature prediction from a machine learning model 111 to operate the wind turbine.

A machine learning model is trained in a prior step by feeding a training data set into the machine learning model. This produces the trained machine learning model (TMM1) sensor 111 shown in FIG. 4. The TMM1 sensor 111 may be stored in the memory of the main controller 200, or in any other suitable location. The training data set may comprise signals indicating ambient temperature, nacelle temperature, hub temperature, power, wind speed, light intensity and time of day. The training data set may be from some of the sensors 30-41 of the wind turbine 1, or other sensors (for instance sensors of another wind turbine).

The trained TMM1 sensor 111 is then during operation able to receive sensor inputs 111a (for instance inputs from some or all of the sensors 30-41 of the wind turbine 1) and produce an output as a first value predicting the ambient temperature based on these sensor inputs. Note that the sensor inputs 111a into the TMM 111 may include an input from the ambient temperature sensor 41, which in this case also acts as a reference sensor so will be referred to below as reference sensor 41.

Like the TMM 11, the TMM1 sensor 111 may be implementing a neural network or a support vector machine regression model for example. The TMM1 sensor 111 may be trained by supervised learning (developing a predictive model based on both input and output data) or unsupervised learning (grouping and interpreting data based only on input data).

The TMM1 111 is validated at step 115 and only used by the control system 20 at step 151 if it passes the validation process.

More specifically, the control system 20 may feed sensor inputs 111a into the TMM1 sensor 111 to obtain a first value 111b. By way of example, these sensor inputs 111a may be received from the reference sensor 41, nacelle temperature sensor 40, hub temperature sensor 34, power sensor 37, wind speed sensor 33, light intensity sensor 39, and a time of day sensor. The TMM1 111 is then validated by comparing the first value 111b with a second value 41b from reference sensor 41.

In response to a validation of the TMM1 sensor value 111a (that is, if the TMM 111 is validated at step 115) then the TMM1 111 may be used to operate the wind turbine at step 151. Thus for example if the ambient temperature predicted by the output 111b of the TMM1 111 changes, then operating parameters of the wind turbine may be changed at step 151. For instance, if the ambient temperature becomes very high, then the wind turbine may be de-rated.

The TMM1 111 may be validated by determining a difference or ratio between the first value 111b from the TMM1 sensor 111 and the second value 41b from the second sensor in the form of reference sensor 41; and comparing the difference or ratio with a threshold. For example the TMM1 111 may be validated if abs (TMM1-Sensor) is less than a threshold—where (TMM1-Sensor) is a difference between the values 111b and 41b.

In this case, the TMM1 111 is validated at step 115 by directly comparing single instantaneous parameter values (i.e. ambient temperature values) output by the TMM1 111 and the reference sensor 41. In other examples, statistical values (i.e. values obtained by statistically analysing a time series of parameter values) may be compared instead, or in addition to the parameter values, to validate the TMM1 111.

For example, the control system 20 may calculate a difference between T1(Average) and T2(Average), where T1(Average) is a mean average of a time series of temperatures generated by the TMM1 111, and T2(Average) is an average of a time series of temperatures generated by the reference sensor 41.

In another example, the control system 20 may calculate a ratio between SD1 and SD2, where SD1 is a standard deviation of a time series of wind directions generated by the TMM1 111, and SD2 is a standard deviation of a time series of wind directions generated by the reference sensor 41.

If the ratio SD1/SD2 is outside a range (for instance 0.8 to 1.2), then the TMM1 111 is not validated and not used to operate the wind turbine at step 151. If the ratio SD1/SD2 is within the range, the TMM1 111 may be validated and used to operate the wind turbine at step 151.

In other examples, the control system 20 may perform the validation by comparing other statistical measures, for instance a max value, median value, min value, variance or an output of a cumulative sequential analysis such as CUSUM.

If the TMM1 111 is not validated at step 115 (i.e. the answer at step 115 is "No") then the process checks whether the reference sensor 41 is OK. If the reference sensor 41 is OK, then the ambient temperature signal from the reference sensor 41 is used by the control system 20 to operate the wind turbine at step 150.

If the reference sensor 41 is not OK, then the process reaches a "function not working" state 152. When this "function not working" state 152 is reached, then a number of actions may be taken. For example, the control system 20 may use another substitute system to operate the wind turbine. The substitute system may be a further ambient temperature sensor, or a further model (not shown) for example. Alternatively, the control system 20 may shut down, uprate or de-rate the wind turbine.

In summary, the process of FIG. 4 operates as follows. Sensor inputs 111a are fed into the TMM1 sensor 111 to obtain a first value 111b. The TMM1 111 is validated by comparing the first value 111b with a second value 41b from a reference sensor 41. In response to a validation of the TMM1 sensor 111, the TMM1 111 is used to operate the wind turbine. The TMM1 111 continues to be used and continuously validated by feeding subsequent sensor inputs into the TMM1 111 to obtain a subsequent first values, and validating the TMM1 111 by comparing the subsequent first values with subsequent second values from the reference sensor 41. This continues until the TMM1 111 fails the validation process. In response to a non-validation of the TMM1 111, the process either uses the reference sensor 41, or reaches the "function not working" state 152.

The method of FIG. 4 uses an ambient temperature prediction from the TMM 111 to operate the wind turbine, and uses the ambient temperature sensor 41 as a reference sensor. An equivalent method may be used for other parameters, using one of the other sensors 30-41 as a reference sensor.

Instead of using a TMM sensor 11 as a backup for a sensor 35 (as in FIG. 3), the method of FIG. 4 can be used if the TMM1 sensor 111 is much more precise than the sensor 41. The sensor 41 is only used as backup and to validate the TMM 111. The sensor 41 can also be used by the TMM 111 to give a more accurate output.

Figure 5:
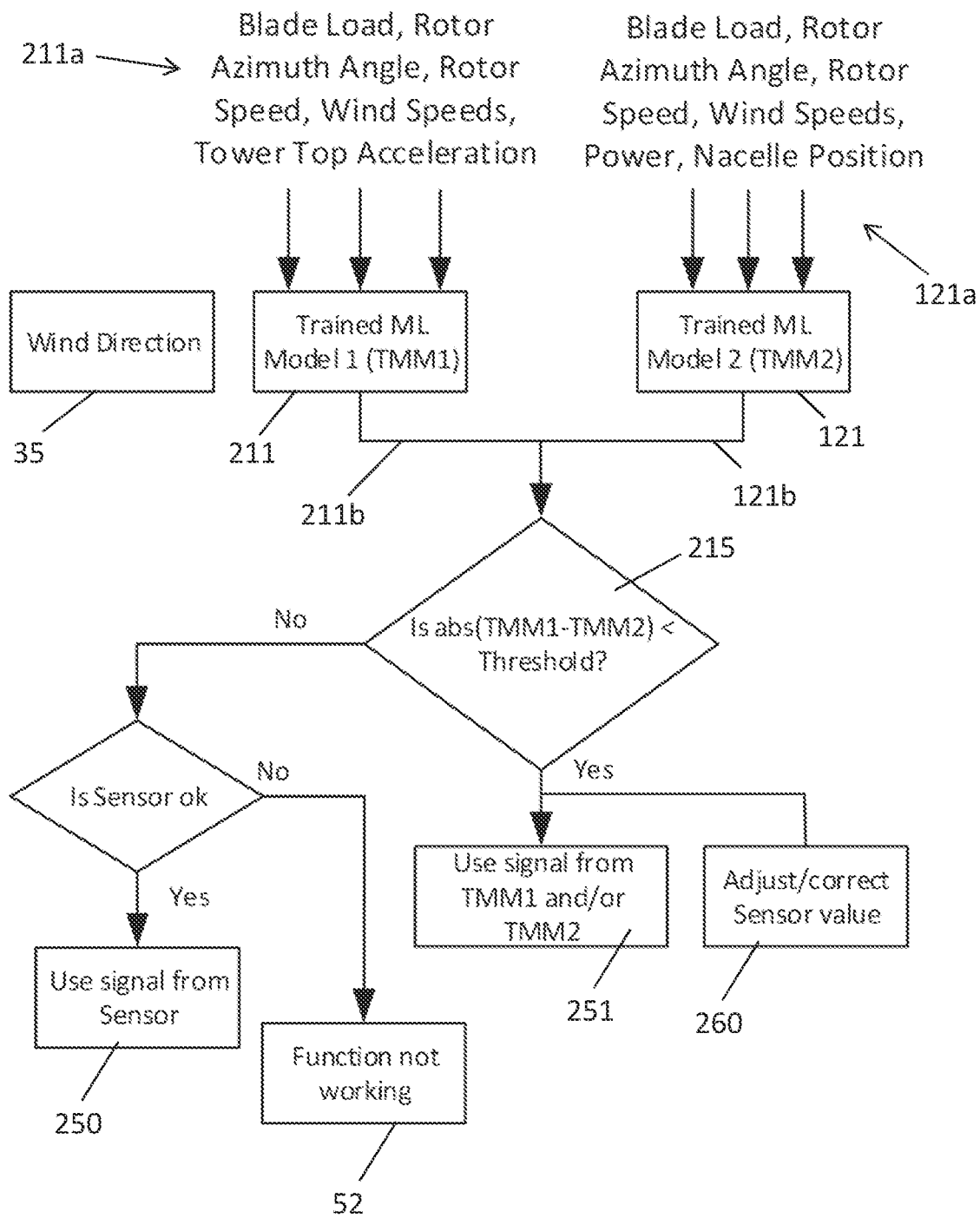
FIG. 5 shows a third method of operating the wind turbine.

A third method shown in FIG. 5 uses a sensor implementing a trained machine learning model to provide, for example, a wind direction estimate for operation of the wind turbine 1.

The method of FIG. 5 uses the wind direction sensor 35 and a first sensor implementing a first trained machine learning model (TMM1) 211. The TMM1 211 may be identical to the TMM 11 of FIG. 3 except it is trained on a slightly different training data set: in this example the TMM1 211 may be trained on a set of signals indicating blade load, rotor azimuth angle, rotor speed, wind speed and tower top acceleration.

A second sensor implementing a second trained machine learning model (TMM2) 121 is also provided. In contrast to the SPM 12 of FIG. 3, the TMM2 sensor 121 of FIG. 5 implements a trained machine learning model similar to the TMM 11. The TMM2 121 generates an output 121b based on sensor inputs 121a.

Like the TMM sensor 11, the second TMM2 sensor 121 is trained by feeding a training data set into the machine learning model in a prior step. However, the training data set for the second TMM2 121 is slightly different to the training data set for the first TMM1 211.

By way of example, the TMM1 211 may have been trained by feeding a first training data set into the TMM1 211 (for instance blade load, rotor azimuth angle, rotor speed, wind speed and tower top acceleration); and the TMM2 121 may have been trained by feeding a second training data set into the TMM2 121 (for instance blade load, rotor azimuth angle, rotor speed, wind speed, power and nacelle position). In this example the second training data set is slightly different to the first training data set. The training data sets may be from some of the sensors 30-41 of the wind turbine 1, or other sensors (for instance sensors of another wind turbine).

Each sensor implementing a trained machine learning model is then able to receive a respective set of sensor inputs 211a, 121a (for instance inputs from some of the sensors 30-41 of the wind turbine 1) during operation of the wind turbine 1 and produce an output 211b, 121b in the form of sensor values predicting the wind direction based on these sensor inputs.

Like the TMM 11 of FIG. 3, each sensor 211, 121 may comprise a neural network or a support vector machine regression model, for example. The sensors 211, 121 may have been trained by supervised learning (developing a predictive model based on both input and output data) or unsupervised learning (grouping and interpreting data based only on input data).

To reduce the risk that the sensors fail in the same way, the sensors 211 and 121 may be trained using different machine learning methods such as, but not limited to: Linear and Non-Linear Regressions; Neural Networks (and derived); Support Vector Machine regression; Decision Trees; Gaussian Process Regression; and Tree Ensembles. Alternatively, the sensor 211 and 121 may have been trained using the same machine learning methods, but with different sets of training data. For example, the training data sets may be from different sets of sensors, different turbine types or different geographical locations. Any combination of the above-mentioned methods can also be used.

In the illustrated embodiment, the sensor TMM1 is the first sensor obtaining the first value 211b and the sensor TMM2 is the second sensor obtaining the second value 121b.

The values of the sensors 211, 121 are validated at step 215 and only used by the control system 20 to operate the wind turbine if they pass the validation process.

More specifically, the control system 20 may feed sensor inputs 211a into the sensor 211 to obtain a first value 211b. By way of example, these sensor inputs 211a may be received from the blade load sensor 30, rotor azimuth angle sensor 31, rotor speed sensor 32, wind speed sensor 33 and tower top acceleration sensor 36.

Similarly, the control system 20 may feed sensor inputs 121a into the sensor 121 to obtain a second value 121b. By way of example, these sensor inputs 121a may be received from the blade load sensor 30, rotor azimuth angle sensor 31, rotor speed sensor 32, wind speed sensor 33, power sensor 37 and nacelle position sensor 38.

As with the training data sets, the sensor inputs 121*a* fed into the sensor 121 may be from a different set of sensors than the sensor inputs 211*a* fed into the sensor 211. For example, the sensor inputs 211*a* may be from a first set of sensors 30-33 and 36; and the sensor inputs 121*a* may be from a second set of sensors 30-33, 37 and 38.

The sensor 211, 121 are then validated at step 215 by comparing the first value 211*b* with the second value 121*b*. If both machine learning model implemented sensors are behaving as expected, then the outputs should be similar or identical.

In response to a validation of the sensor 211, 121 (that is, if the sensor values are validated at step 215) then one or both of the TMMs 211, 121 may be used to operate the wind turbine at step 251. For example, an average of the two models may be used, or only one of the models. Thus, if the wind direction predicted by the model(s) changes, then the yaw direction of the nacelle and/or other operating parameters of the wind turbine may be changed in response.

The sensor values may be validated at step 215 by determining a difference or ratio between the first value 211*b* and the second value 121*b*; and comparing the difference or ratio with a threshold. For example, the sensors may be validated if abs (TMM1−TMM2) is less than a threshold— where (TMM1−TMM2) is a difference between the values 211*b* and 121*b*.

In this case, the sensor are validated by directly comparing single instantaneous parameter values (i.e. wind direction values) output by the sensors. In other examples, statistical values (i.e. values obtained by statistically analysing a time series of parameter values) may be compared instead, or in addition to the parameter values, to validate the TMMs.

For example, the control system 20 may calculate a difference between WD1(Average) and WD2(Average), where WD1(Average) is a mean average of a time series of wind directions generated by the first TMM1 sensor 211, and WD2(Average) is a mean average of a time series of wind directions generated by the second TMM2 sensor 121.

In another example, the control system 20 may calculate a ratio between SD1 and SD2, where SD1 is a standard deviation of a time series of wind directions generated by the first TMM1 sensor 211, and SD2 is a standard deviation of a time series of wind directions generated by the second TMM2 sensor 121. If the ratio SD1/SD2 is outside a range (for instance 0.8 to 1.2) then the sensor values are not validated and not used to operate the wind turbine at step 251. If the ratio SD1/SD2 is within the range, the sensor values may be validated and one or both may be used to operate the wind turbine at step 251.

In other examples, the control system 20 may perform the validation by comparing other statistical measures, for instance a max value, median value, min value, variance or an output of a cumulative sequential analysis such as CUSUM.

If the sensors are not validated at step 215, then the wind direction sensor 35 may be checked. If the wind direction sensor 35 is OK, then the wind direction signal from the sensor 35 may be used by the control system 20 to operate the wind turbine at step 250.

If the wind direction sensor 35 is not OK (for instance if it has failed or is producing inaccurate data) then the process reaches the "function not working" state 52.

The process of FIG. 5 uses the wind direction sensor 35 as a back-up. Optionally the wind direction sensor 35 may be adjusted or corrected at step 260 on the basis of the wind direction predictions from the validated sensor values 211, 121—for instance by modifying a gain or offset applied to the output of the sensor 35. This improves the accuracy and reliability of the sensor 35. In scenarios where the machine learning model implemented sensors fail, the function can switch to the newly calibrated sensor 35 with higher accuracy until the machine learning model implemented sensors produce valid signals.

In summary, the process of FIG. 5 operates as follows. A first sensor is implementing a first machine learning model (TMM1 211) that have been trained by feeding a first training data set into the first machine learning model. A second sensor is implementing a second machine learning model (TMM2 121) that have been trained by feeding a second training data set into the second machine learning model. The second training data set is different to the first training data set. First and second sets 211*a*, 121*a* of sensor inputs are fed into the sensors to obtain outputs 211*b*, 121*b*. The sets 211*a*, 121*a* of sensor inputs are different from each other. The sensor values from sensors 211 and 121 are validated by comparing their outputs 211*b*, 121*b*. In response to a validation of the sensors 211, 121, one or both of the sensor values is used to operate the wind turbine. The sensor 211, 121 continue to be used and continuously validated by feeding subsequent sensor inputs into the sensors 211, 121 to obtain subsequent first and second values, and validating the sensors 211, 121 by comparing these subsequent values. This continues until the sensor values fail the validation process. In response to a non-validation of the sensors 211, 121, the sensor 35 is used. If the sensor 35 is not OK then the process reaches the "function not working" state 52.

The method of FIG. 5 is used to control the wind turbine on the basis of wind direction estimates from a pair of machine learning model implemented sensors, using the wind direction sensor 35 as a back-up. An equivalent method may be used to control the wind turbine on the basis of prediction of other parameter values (such as ambient temperature, wind speed etc.) from other machine learning models, using another one of the other sensors 30-41 as a back-up.

Figure 6:
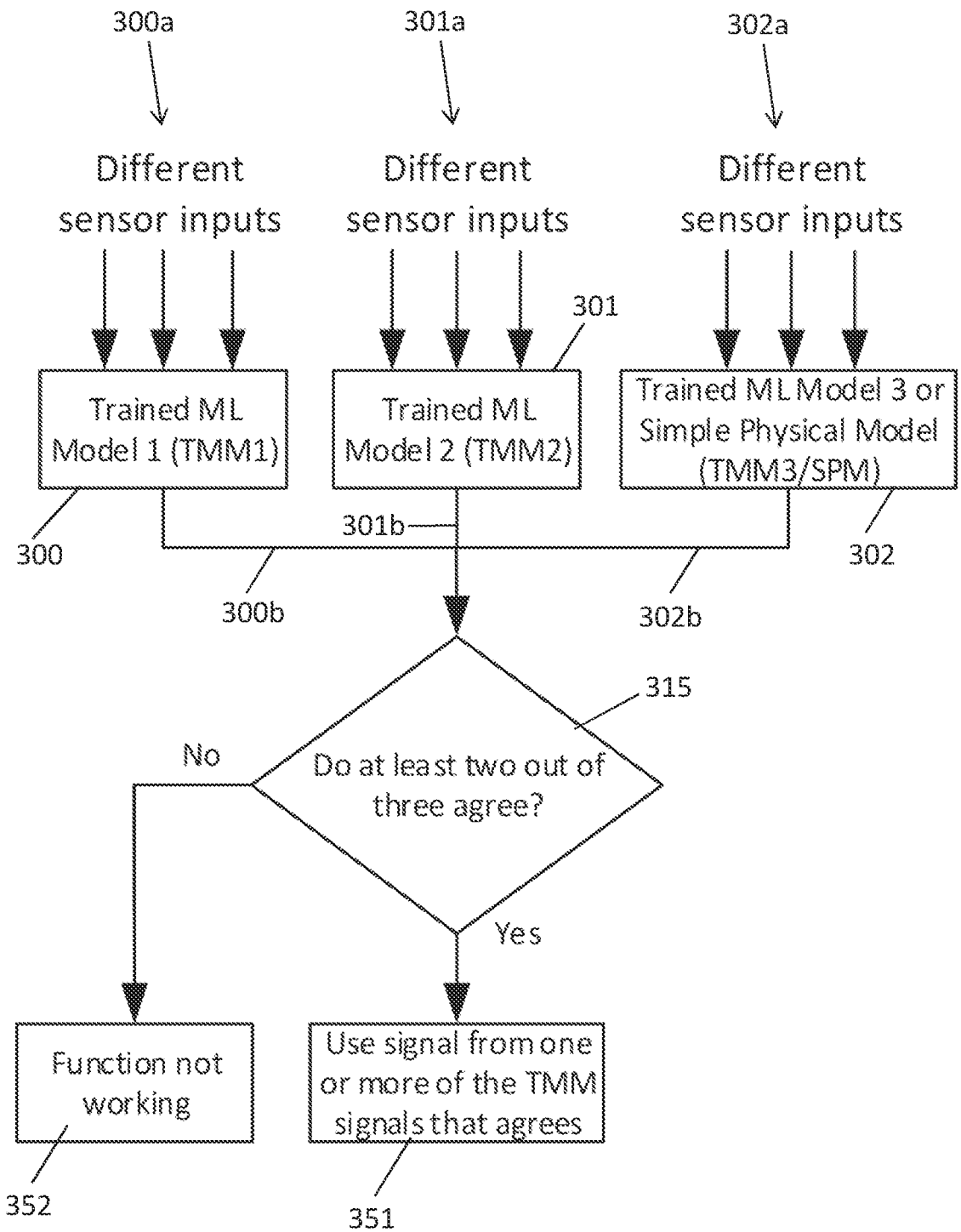
FIG. 6 shows a fourth method of operating the wind turbine.

A fourth method shown in FIG. 6 uses model-based sensors 300-302 to provide a parameter value prediction for operation of the wind turbine 1.

The method of FIG. 6 is similar to FIG. 5 in that it uses first and second sensors implementing trained machine learning models (sensor TMM1 300 and sensor TMM2 301) which have been trained using slightly different training data sets and/or different machine learning methods. The operational parameter for FIG. 5 is wind direction whereas FIG. 6 is more generic, not referring to a specific operational parameter. The operational parameter for FIG. 6 may be wind direction, ambient temperature or any other parameter. The embodiment of FIG. 6 enables the wind turbine to be operated without any sensor directly measuring the parameter.

A third sensor implementing a third model 302 is also provided. The third model may be a third trained machine learning model, trained using a different training data set and/or a different machine learning method to the TMM 300 and the TMM 301. Alternatively, the third model 302 may be a simple physical model similar to the SPM 12 shown in FIG. 3.

Different sets 300*a*, 301*a*, 302*a* of sensor inputs are input into the three models 300-302, which generate three respective outputs 300*b*, 301*b*, 302*b*. These outputs are compared in validation step 315. If at least two out of three of the outputs agree, then the two or three models associated with these outputs are validated. The output from one or more of the validated models is then used as the operational parameter of the wind turbine at step 351. Where the outputs of multiple sensors are used at step 351, then an average may be used for example.

If none of the outputs 300*b*, 301*b*, 302*b* agree with each other, then the process reaches a "function not working" state 352 similar to the states 52, 152 described above.

In the description above, a control system 20 is configured to operate the wind turbine by one or more of the various methods described with reference to FIGS. 3 to 6. This control system 20 may be part of an initial configuration of the wind turbine. In alternative embodiments of the invention, the methods described with reference to FIGS. 3 to 6 may be performed by a retrofit control system which is not part of the initial configuration of the wind turbine, and (like the control system 20) may be remote from the wind turbine. In this case the retrofit control system stores the computer program product comprising software code adapted to operate the wind turbine 1 when executed on a data processing system of the retrofit control system. The computer program product stored by the retrofit control system is adapted to perform one or more of the various methods described below with reference to FIGS. 3 to 6.

Although the invention has been described above with reference to one or more preferred embodiments, it will be appreciated that various changes or modifications may be made without departing from the scope of the invention as defined in the appended claims.

The invention claimed is:

1. A method of operating a wind turbine in accordance with an operational parameter, the method comprising:
obtaining a first value of the operational parameter by a first source, wherein the first source is a trained machine learning model taking a set of operating parameters as input and outputting the first value;
obtaining a second value of the operational parameter by a second source, wherein the second source is a reference sensor, and the reference sensor provides one of the operating parameters of the set of operating parameters being input into the trained machine learning model;
comparing a difference between the first value and the second value with a comparison criterion to determine a validity of the first value; and
in response determining the first value is invalid, shutting down the wind turbine or changing a control strategy of the wind turbine.

2. The method of claim 1, wherein the operational parameter is a wind speed, a wind direction, a blade pitch angle, a blade load, a temperature, a rotor azimuth angle, a rotor speed, a tower acceleration, an electrical power, a nacelle position, a light intensity, or a parameter value derived from a combination thereof.

3. The method of claim 1, wherein the comparing the first value with the second value in accordance with the comparison criterion is based on comparing a statistical value of the first value and a statistical value of the second value which are obtained by statistically analysing a time series of the first and second values.

4. The method of claim 1 wherein the comparing the first value with the second value in accordance with the comparison criterion is based on comparing the first value and the second value to generate an indicator; and comparing the indicator with a validation threshold.

5. The method of claim 1, wherein the reference sensor is at least one of a temperature sensor, a wind speed sensor, a wind direction sensor, a blade load sensor, a blade pitch angle sensor, a rotor azimuth angle sensor, a rotor speed sensor, a tower top acceleration sensor, a power sensor, a nacelle position sensor, a light intensity sensor, or a time of day sensor.

6. The method of claim 1, wherein the machine learning model is trained using training data set from one or more of: a temperature sensor, a wind speed sensor, a wind direction sensor, a blade load sensor, a blade pitch angle sensor, a rotor azimuth angle sensor, a rotor speed sensor, a tower top acceleration sensor, a power sensor, a nacelle position sensor, a light intensity sensor and a time of day sensor.

7. A wind turbine system comprising:
a wind turbine, and
a control system configured to perform an operation, comprising:
obtaining a first value of an operational parameter by a first source, wherein the first source is a trained machine learning model taking a first set of operating parameters as input and outputting the first value;
obtaining a second value of the operational parameter by a second source, wherein the second source is a computerized physical model taking a second set of operating parameters as input and outputting the second value;
comparing a difference between the first value and the second value with a comparison criterion to determine a validity of the first value;
operating the wind turbine using the first value as the operational parameter if the first value is determined to be valid; and
shutting down the wind turbine or changing a control strategy of the wind turbine if the first value is determined to be invalid.

8. The wind turbine system of claim 7, wherein the operational parameter is a wind speed, a wind direction, a blade pitch angle, a blade load, a temperature, a rotor azimuth angle, a rotor speed, a tower acceleration, an electrical power, a nacelle position, a light intensity, or a parameter value derived from a combination thereof.

9. The wind turbine system of claim 7, wherein comparing the first value with the second value in accordance with the comparison criterion is based on comparing a statistical value of the first value and a statistical value of the second value, which are obtained by statistically analysing a time series of the first and second values.

10. The wind turbine system of claim 7, wherein comparing the first value with the second value in accordance with the comparison criterion is based on:
comparing the first value and the second value to generate an indicator; and
comparing the indicator with a validation threshold.

11. The wind turbine system of claim 7, wherein the machine learning model is trained using training data set from one or more of: a temperature sensor, a wind speed sensor, a wind direction sensor, a blade load sensor, a blade pitch angle sensor, a rotor azimuth angle sensor, a rotor speed sensor, a tower top acceleration sensor, a power sensor, a nacelle position sensor, a light intensity sensor and a time of day sensor.

12. A wind turbine system comprising:
a wind turbine, and
a control system configured to perform an operation, comprising:

obtaining a first value of an operational parameter by a first source, wherein the first source is a first trained machine learning model taking a first set of operating parameters as input and outputting the first value;

obtaining a second value of the operational parameter by a second source, wherein the second source is a second trained machine learning model taking a second set of operating parameters as input and outputting the second value;

comparing a difference between the first value and the second value with a comparison criterion to determine a validity of the first value;

operating the wind turbine using the first value as the operational parameter if the first value is determined to be valid; and shutting down the wind turbine or changing a control strategy of the wind turbine if the first value is determined to be invalid.

13. The wind turbine system of claim 12, wherein the first trained machine learning model is trained by a first training data set, and the second trained machine learning model is trained by feeding a second training data set, wherein the second training data set is different to the first training data set.

14. The wind turbine system of any of claim 13 wherein the first training data set is a first set of sensor inputs from a first set of sensors, and the second training data set is a second set of sensor inputs from a second set of sensors, wherein the second set of sensors is different to the first set of sensors.

15. The wind turbine system of claim 12, wherein the first trained machine learning model is trained by a first machine learning method, and the second trained machine learning model is trained by a second machine learning method, wherein the second machine learning method is different to the first machine learning method.

16. The wind turbine system of claim 12, wherein the operational parameter is a wind speed, a wind direction, a blade pitch angle, a blade load, a temperature, a rotor azimuth angle, a rotor speed, a tower acceleration, an electrical power, a nacelle position, a light intensity, or a parameter value derived from a combination thereof.

17. The wind turbine system of claim 12, wherein comparing the first value with the second value in accordance with the comparison criterion is based on comparing a statistical value of the first value and a statistical value of the second value, which are obtained by statistically analysing a time series of the first and second values.

18. The wind turbine system of claim 12, wherein comparing the first value with the second value in accordance with the comparison criterion is based on:

comparing the first value and the second value to generate an indicator; and comparing the indicator with a validation threshold.

19. The wind turbine system of claim 12, wherein the first trained machine learning model is trained using training data set from one or more of: a temperature sensor, a wind speed sensor, a wind direction sensor, a blade load sensor, a blade pitch angle sensor, a rotor azimuth angle sensor, a rotor speed sensor, a tower top acceleration sensor, a power sensor, a nacelle position sensor, a light intensity sensor and a time of day sensor.

* * * * *